(12) United States Patent
Kumar et al.

(10) Patent No.: US 11,310,768 B2
(45) Date of Patent: Apr. 19, 2022

(54) MONITORING PERIODICITY FOR PAGING MESSAGES

(71) Applicant: QUALCOMM Incorporated, San Diego, CA (US)

(72) Inventors: Sumit Kumar, Hyderabad (IN); Akash Srivastava, Hyderabad (IN); Priyangshu Ghosh, Hyderabad (IN); Rajeev Kumar, Bangalore (IN); Tanay Kabra, Hyderabad (IN); Radhakrishna Madhur Bommakanti, Khammam (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/028,859

(22) Filed: Sep. 22, 2020

(65) Prior Publication Data

US 2022/0095271 A1 Mar. 24, 2022

(51) Int. Cl.
*H04W 68/02* (2009.01)
(52) U.S. Cl.
CPC .................................. *H04W 68/02* (2013.01)
(58) Field of Classification Search
CPC .................................................... H04W 68/02
USPC .......................................................... 455/458
See application file for complete search history.

(56) References Cited

U.S. PATENT DOCUMENTS

| | | | | |
|---|---|---|---|---|
| 2011/0319072 | A1* | 12/2011 | Ekici | H04W 48/18 455/426.1 |
| 2013/0040697 | A1* | 2/2013 | Ekici | H04W 88/06 455/552.1 |
| 2013/0272138 | A1* | 10/2013 | Ou | H04W 24/00 370/241 |
| 2018/0332490 | A1* | 11/2018 | Manepalli | H04W 24/08 |
| 2020/0100209 | A1* | 3/2020 | Lin | H04W 8/18 |
| 2020/0322918 | A1* | 10/2020 | Shih | H04W 68/02 |

* cited by examiner

*Primary Examiner* — Joel Ajayi
(74) *Attorney, Agent, or Firm* — Holland & Hart LLP

(57) ABSTRACT

Methods, systems, and devices for wireless communications are described to support monitoring for paging messages from a base station (e.g., a cellular network node) using a greater periodicity than a discontinuous reception (DRX) cycle periodicity. A UE may monitor for and receive paging messages from a network node using a first subscription registered with a first radio access technology (RAT) while operating in DRX mode for a second RAT associated with the base station. The UE may identify a first periodicity for monitoring for paging messages from the base station that is greater than the DRX periodicity. The UE may have a second subscription that may be registered with a second base station. The UE may perform a tuneaway procedure from the second base station and monitor for paging messages from the base station according to the first periodicity.

26 Claims, 10 Drawing Sheets

US 11,310,768 B2

MONITORING PERIODICITY FOR PAGING MESSAGES

FIELD OF TECHNOLOGY

The following relates to wireless communications, including monitoring periodicity for paging messages.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may be registered for multiple wireless services, and may monitor for paging messages for each of the wireless services, which may increase power usage at the UE.

SUMMARY

The described techniques relate to improved methods, systems, devices, and apparatuses that support modifying monitoring periodicity for paging messages. Generally, the described techniques provide for a user equipment (UE) to monitor for paging messages from a base station (e.g., a cellular network node) using a greater periodicity (e.g., less frequently) than a default or preconfigured monitoring periodicity (e.g., a discontinuous reception (DRX) cycle periodicity). The UE may monitor for and receive paging messages from a network node using a first subscription registered with a wireless fidelity (Wi-Fi) radio access technology (RAT) while operating in DRX mode for a cellular RAT (e.g., the base station). The UE may identify a first periodicity for monitoring for paging messages from the base station that is greater than the DRX periodicity, which may reduce monitoring occasions associated with a cellular RAT. The UE may additionally have or be configured with a second subscription that may be registered with a cellular RAT (e.g., with a second base station). The UE may receive one or more data messages from the second base station. The UE may also perform a tuneaway procedure from the second base station and monitor for paging messages from the base station according to the first periodicity. For example, the UE may identify the first periodicity for monitoring for paging messages from the base station that is greater than the DRX periodicity, which may reduce tuneaway procedures to the base station and increase data throughput associated with receiving data messages from the second base station.

A method of wireless communications at a UE is described. The method may include establishing, by a first subscription of the UE and with a network node, a voice communication registration for communicating voice services over unlicensed radio spectrum using a first radio access technology, receiving first paging messages from the network node over the unlicensed radio spectrum using the first radio access technology, identifying, based on receiving the first paging messages from the network node, a first monitoring periodicity for monitoring for second paging messages from a cellular network node that uses a second radio access technology, where the first monitoring periodicity is greater than a discontinuous reception cycle periodicity associated with the cellular network node, and monitoring, by the first subscription, for the second paging messages from the cellular network node during one or more monitoring occasions according to the first monitoring periodicity.

An apparatus for wireless communications at a UE is described. The apparatus may include a processor, memory coupled with the processor, and instructions stored in the memory. The instructions may be executable by the processor to cause the apparatus to establish, by a first subscription of the UE and with a network node, a voice communication registration for communicating voice services over unlicensed radio spectrum using a first radio access technology, receive first paging messages from the network node over the unlicensed radio spectrum using the first radio access technology, identify, based on receiving the first paging messages from the network node, a first monitoring periodicity for monitoring for second paging messages from a cellular network node that uses a second radio access technology, where the first monitoring periodicity is greater than a discontinuous reception cycle periodicity associated with the cellular network node, and monitor, by the first subscription, for the second paging messages from the cellular network node during one or more monitoring occasions according to the first monitoring periodicity.

Another apparatus for wireless communications at a UE is described. The apparatus may include means for establishing, by a first subscription of the UE and with a network node, a voice communication registration for communicating voice services over unlicensed radio spectrum using a first radio access technology, receiving first paging messages from the network node over the unlicensed radio spectrum using the first radio access technology, identifying, based on receiving the first paging messages from the network node, a first monitoring periodicity for monitoring for second paging messages from a cellular network node that uses a second radio access technology, where the first monitoring periodicity is greater than a discontinuous reception cycle periodicity associated with the cellular network node, and monitoring, by the first subscription, for the second paging messages from the cellular network node during one or more monitoring occasions according to the first monitoring periodicity.

A non-transitory computer-readable medium storing code for wireless communications at a UE is described. The code may include instructions executable by a processor to establish, by a first subscription of the UE and with a network node, a voice communication registration for communicating voice services over unlicensed radio spectrum using a first radio access technology, receive first paging messages from the network node over the unlicensed radio spectrum using the first radio access technology, identify, based on receiving the first paging messages from the network node, a first monitoring periodicity for monitoring for second paging messages from a cellular network node that uses a second radio access technology, where the first monitoring periodicity is greater than a discontinuous reception cycle periodicity associated with the cellular network node, and monitor, by the first subscription, for the second paging messages from the cellular network node during one or more monitoring occasions according to the first monitoring periodicity.

In some examples of the method, apparatuses, and non-transitory computer-readable medium described herein, identifying the first monitoring periodicity may include operations, features, means, or instructions for identifying a set of configured monitoring durations, each configured monitoring duration including a set of monitoring occasions, and monitoring within a last monitoring occasion of each of the set of configured monitoring durations.

Some examples of the method, apparatuses, and non-transitory computer-readable medium described herein may further include operations, features, means, or instructions for refraining from monitoring a remainder of the set of monitoring occasions of each of the set of configured monitoring durations other than the last monitoring occasion of each of the set of configured monitoring durations.

In some examples of the method, apparatuses, and non-transitory computer-readable medium described herein, each configured monitoring duration of the set includes a modification boundary including five or more monitoring occasions.

Some examples of the method, apparatuses, and non-transitory computer-readable medium described herein may further include operations, features, means, or instructions for monitoring, within the last monitoring occasion of each of the set of configured monitoring durations, for an indication of a change in system information from the cellular network node to take place in a next monitoring duration.

Some examples of the method, apparatuses, and non-transitory computer-readable medium described herein may further include operations, features, means, or instructions for performing, within the last monitoring occasion of each of the set of configured monitoring durations, measurements associated with signals from the cellular network node.

Some examples of the method, apparatuses, and non-transitory computer-readable medium described herein may further include operations, features, means, or instructions for identifying a quality threshold associated with communications with the network node using the first radio access technology, determining a quality associated with the communications with the network node using the first radio access technology, and decreasing the first monitoring periodicity based on the quality falling below the quality threshold.

In some examples of the method, apparatuses, and non-transitory computer-readable medium described herein, decreasing the first monitoring periodicity may include operations, features, means, or instructions for setting the first monitoring periodicity to the discontinuous reception cycle periodicity.

In some examples of the method, apparatuses, and non-transitory computer-readable medium described herein, a second subscription of the UE may be configured as a default data subscription, the second subscription registered with a second cellular network node that uses the second radio access technology.

In some examples of the method, apparatuses, and non-transitory computer-readable medium described herein, the first subscription may be configured as a non default data subscription.

In some examples of the method, apparatuses, and non-transitory computer-readable medium described herein, monitoring, by the first subscription, for the second paging messages may include operations, features, means, or instructions for performing a tuneaway procedure from the second cellular network node to the cellular network node according to the first monitoring periodicity.

In some examples of the method, apparatuses, and non-transitory computer-readable medium described herein, performing the tuneaway procedure may include operations, features, means, or instructions for identifying a set of configured monitoring durations, each configured monitoring duration including a set of monitoring occasions, and performing the tuneaway procedure within a last monitoring occasion of each of the set of configured monitoring durations.

Some examples of the method, apparatuses, and non-transitory computer-readable medium described herein may further include operations, features, means, or instructions for establishing, by the second subscription and with a second network node, a second voice communication registration for communicating voice services over unlicensed radio spectrum using the first radio access technology.

DETAILED DESCRIPTION

Figure 1:
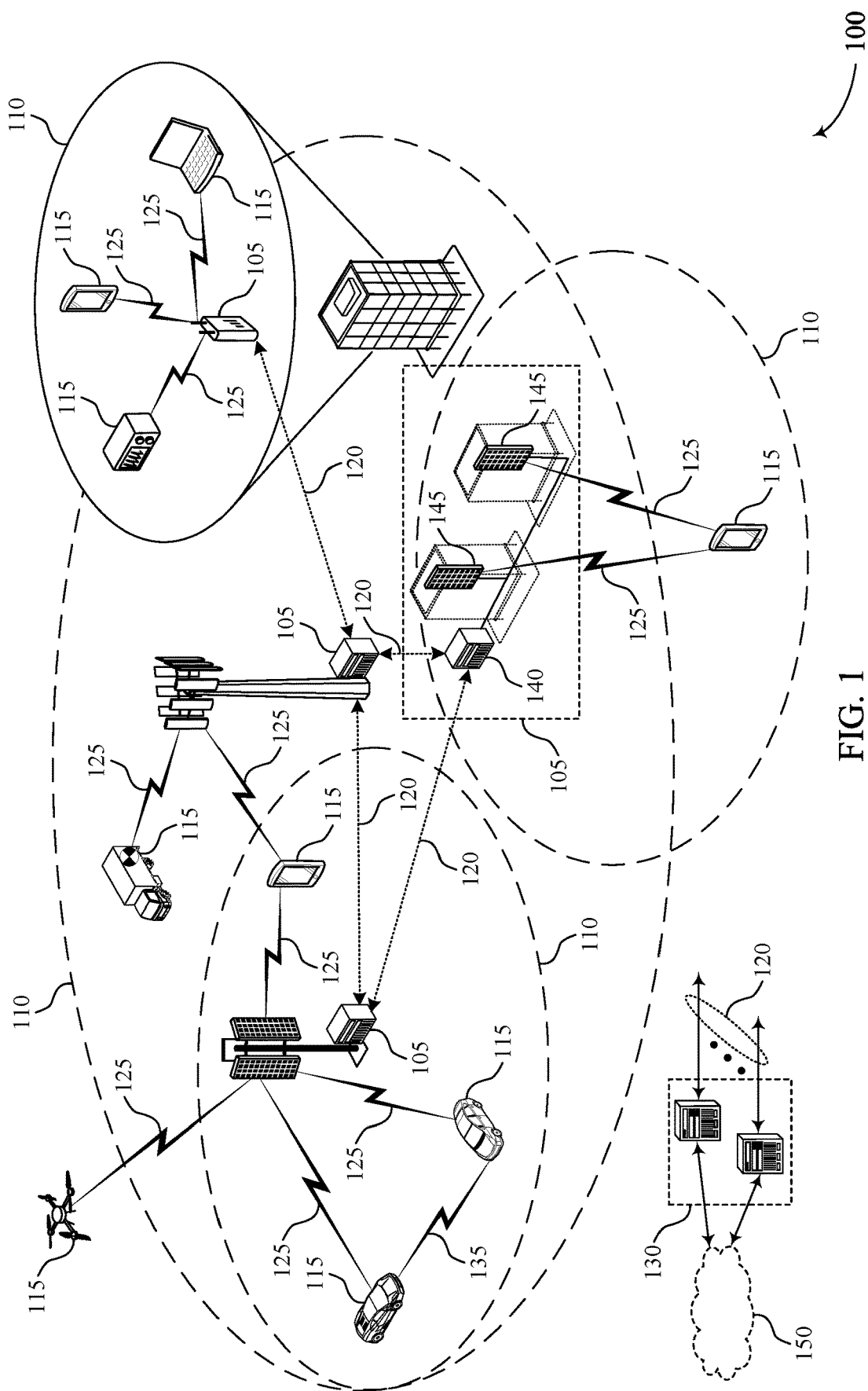
FIG. 1 illustrates an example of a wireless communications system that supports monitoring periodicity for paging messages in accordance with aspects of the present disclosure.

A user equipment (UE) may have or be configured with one or more subscriptions for wireless communications. A subscription may support registration with a wireless fidelity (Wi-Fi) network (e.g., using a Wi-Fi radio access technology (RAT)) to register the UE to a wireless communications network. A subscription may additionally or alternatively support registration with a cellular RAT. The UE may have a first subscription that may be registered with a Wi-Fi RAT and a voice Wi-Fi service for voice communications (e.g., to perform calls over Wi-Fi). The UE may receive one or more paging messages from a network node (e.g., associated with the Wi-Fi RAT) and may operate in a discontinuous reception (DRX) cycle for a cellular service (e.g., maintain a cellular stack). The UE may also monitor (e.g., on a DRX cycle periodicity) for paging messages from a base station, which may represent an example of a cellular network node that uses or operates according to a cellular RAT.

In a first example, the first subscription of the UE may be registered for a voice Wi-Fi service, and the UE may receive paging messages and other messages via the voice Wi-Fi service. Monitoring for paging messages from the base station (e.g., cellular RAT) according to the DRX periodicity may, in some cases, reduce available power (e.g., battery power) at the UE. For example, the UE may already receive paging information associated with wireless communications via paging messages from the network node (e.g., via the Wi-Fi RAT), but may also monitor for cellular paging messages from the base station. In some cases, the UE may follow the cellular DRX processes (e.g., wake-up and page monitoring) configured for the UE without coordination with the Wi-Fi RAT (e.g., and may therefore monitor for paging messages on both RATs).

The present disclosure provides techniques for a UE to monitor for paging messages from the base station using a different periodicity (e.g., and increased periodicity) than the DRX periodicity. For example, the UE may identify a first periodicity for monitoring for paging messages from the base station that is greater than the DRX periodicity, which may reduce monitoring occasions associated with the cellular RAT and may increase battery life. In some examples, monitoring according to the first periodicity may include monitoring for paging messages from the base station one time within a modification boundary. In some examples, monitoring according to the first periodicity may include monitoring for paging messages from base station more than once per modification boundary, but at a greater periodicity than a DRX cycle periodicity.

In a second example, the UE may additionally have or be configured with a second subscription that may be registered with a cellular RAT (e.g., with a second base station). The UE may receive one or more data messages from the second base station, for example, because the second subscription may represent a data subscription or may be registered for a data service with the second base station. In this example, the first subscription may be registered for an aggregated cellular and Wi-Fi service, and the UE may operate in a DRX cycle for the cellular service of the first subscription. The first subscription may be associated with voice messages or communications, such that data may not be communicated using the first subscription.

While receiving one or more data messages from the second base station, the UE may, in some cases, perform a tuneaway procedure (e.g., open tuning gaps) from the second base station to the base station. The tuneaway procedure may include monitoring for one or more paging messages from the base station according to a DRX cycle periodicity, while temporarily stopping communications with the second base station (e.g., refraining from monitoring for data messages). Performing the tuneaway procedure according to the DRX cycle periodicity may reduce throughput associated with data messages, for example, by refraining from monitoring for data messages while performing the tuneaway procedure. Additionally or alternatively, the second base station may reduce the throughput associated with the data messages based on feedback from the UE (e.g., indicating missed data due to the tuneaway procedure).

The present disclosure provides techniques for a UE to perform a tuneaway procedure and monitor for paging messages from the base station with a different periodicity (e.g., increased periodicity) than the DRX periodicity. For example, the UE may identify the first periodicity for monitoring for paging messages from the base station that is greater than the DRX periodicity, which may reduce tuneaway procedures to the base station and increase data throughput associated with receiving data messages from the second base station.

In some examples, monitoring according to the first periodicity may include monitoring for paging messages from the base station and opening a tuneaway one time within a modification boundary. In some examples, the UE may perform the tuneaway procedure more than once per modification boundary, but at a greater periodicity than the DRX cycle. Monitoring according to the first periodicity may include skipping one or more tuneaway procedures that the UE may have otherwise performed.

Aspects of the disclosure are initially described in the context of wireless communications systems. Aspects of the disclosure are further illustrated by and described with reference to a monitoring scheme, a process flow, apparatus diagrams, system diagrams, and flowcharts that relate to monitoring periodicity for paging messages.

FIG. 1 illustrates an example of a wireless communications system 100 that supports adjusting a monitoring periodicity for paging messages in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may have or be configured with one or more subscriptions for wireless communications. A subscription may support registration with a Wi-Fi network (e.g., using a Wi-Fi RAT) to register the UE 115 to a wireless communications network. A subscription may additionally or alternatively support registration with a cellular RAT. The UE 115 may use Wi-Fi services for communicating voice services over the wireless communications network. For example, the UE 115 may have a first subscription that may be registered with a Wi-Fi RAT and a voice Wi-Fi service for voice communications (e.g., to perform calls over Wi-Fi). The UE 115 may receive one or more paging messages from a network node (e.g., associated with the Wi-Fi RAT) and may operate in a DRX cycle for a cellular service (e.g., maintain a cellular stack). The UE 115 may also monitor (e.g., on a DRX cycle periodicity) for paging messages from a base station 105, which may represent an example of a cellular network node that uses or operates according to a cellular RAT.

The UE 115 may monitor for paging messages from the base station 105 using a different periodicity (e.g., and increased periodicity) from a DRX periodicity. For example, the UE 115 may identify a first periodicity for monitoring for paging messages from the base station 105 that is greater than the DRX periodicity, which may reduce monitoring occasions associated with the cellular RAT and may increase battery life. In some examples, monitoring according to the first periodicity may include monitoring for paging messages from the base station 105 one time within a modification boundary. In some examples, monitoring according to the first periodicity may include monitoring for paging messages from base station 105 more than once per modification boundary, but at a greater periodicity than a DRX cycle periodicity.

The UE 115 may additionally have or be configured with a second subscription that may be registered with a cellular RAT (e.g., with a second base station 105). The UE 115 may receive one or more data messages from the second base station 105, for example, because the second subscription may represent a data subscription or may be registered for a data service with the second base station 105. The UE 115 may also perform a tuneaway procedure and monitor for paging messages from the base station 105 according to the first periodicity. For example, the UE 115 may identify the first periodicity for monitoring for paging messages from the base station 105 that is greater than the DRX periodicity, which may reduce tuneaway procedures to the base station 105 and increase data throughput associated with receiving data messages from the second base station 105.

Figure 2:
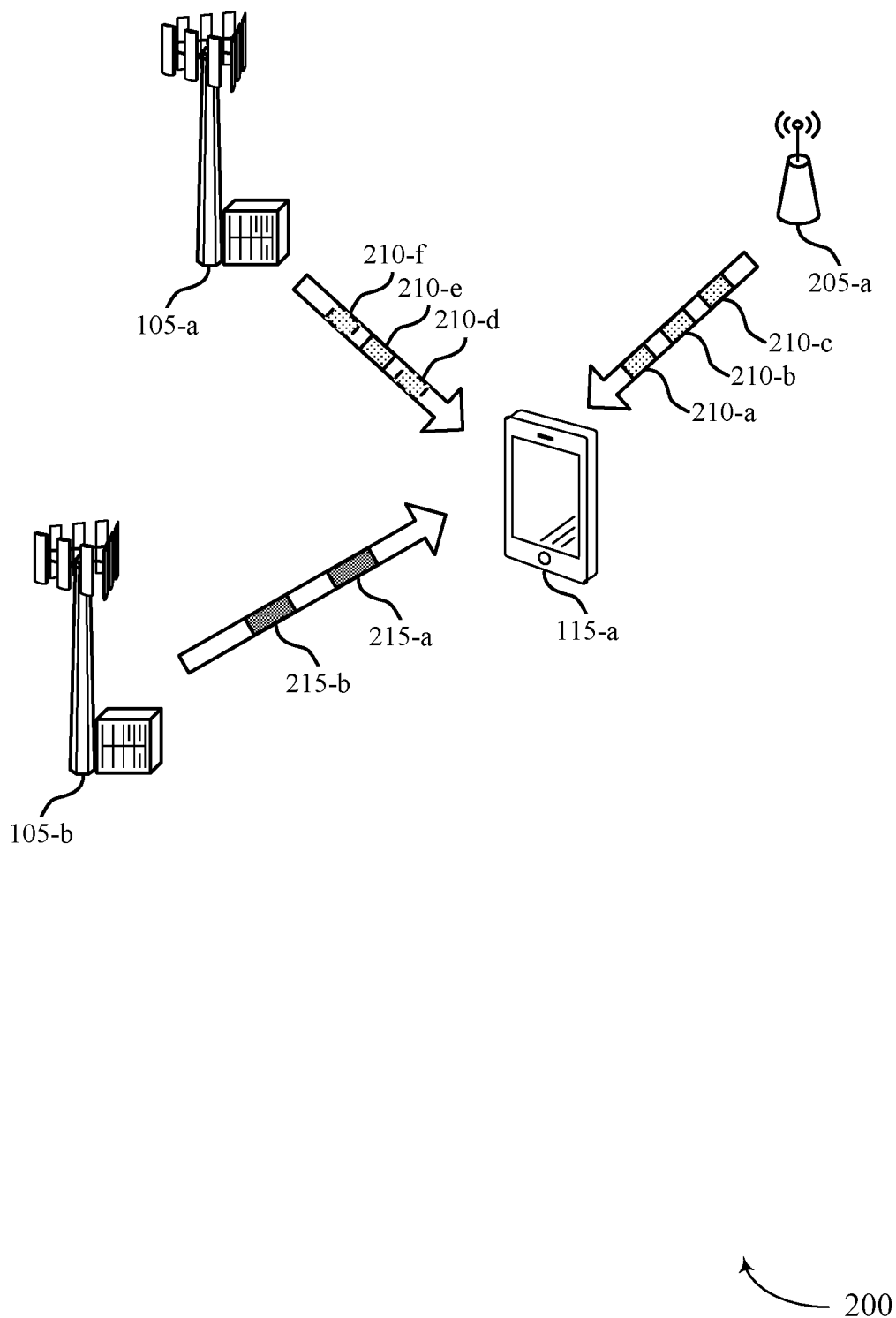
FIG. 2 illustrates an example of a wireless communications system that supports monitoring periodicity for paging messages in accordance with aspects of the present disclosure.

FIG. 2 illustrates an example of a wireless communications system 200 that supports adjusting a monitoring periodicity for paging messages in accordance with aspects of the present disclosure. In some examples, wireless communications system 200 may implement aspects of wireless communications system 100. For example, wireless communications system 200 may include a UE 115-a and base stations 105-a and 105-b, which may represent respective examples of a UE 115 and base stations 105 described with reference to FIG. 1. Wireless communications system 200 may also include a network node 205-a, which may, for example, represent an access point or other network node using or operating according to a Wi-Fi RAT (e.g., a first RAT). As described herein, base stations 105 (e.g., base stations 105-a and 105-b) may represent respective examples of a cellular network node, which may use or operate according to a cellular RAT (e.g., a second RAT).

UE 115-a may have or be configured with one or more subscriptions and may, for example, include a subscriber identity module (SIM) for each of the one or more subscriptions. A subscription may be associated with an operator within a wireless communications network, such as an IMS network. An IMS operator or other operator may support registration with a Wi-Fi network or RAT to register a UE 115 (e.g., UE 115-a) to the wireless communications network. The UE 115 (e.g., UE 115-a) may use Wi-Fi services for communicating voice services (e.g., using a voice over Wi-Fi (VoWifi) service) over the wireless communications network. The Wi-Fi RAT may include unlicensed radio spectrum used for communications between UE 115-a and network node 205-a.

For example, UE 115-a may have a first subscription that may be registered with a Wi-Fi RAT with a VoWifi service or a video telephony Wi-Fi (VT-Wife) service for voice communications (e.g., to perform calls over Wi-Fi). Registering with a voice Wi-Fi service may increase communication quality, among other things, at UE 115-a. In some cases, an operator (e.g., IMS operator) may support VoWifi or VT-Wife registration without supporting other voice services, such as voice services using a cellular RAT. In some cases, UE 115-a may additionally or alternatively be registered for a cellular and Wi-Fi aggregation service (e.g., 5G plus Wi-Fi aggregation or LTE plus Wi-Fi aggregation).

In a first example, the first subscription of UE 115-a may be registered for a voice Wi-Fi service, and UE 115-a may receive paging messages 210 and other messages via the voice Wi-Fi service. In some cases, the first subscription of UE 115-a may also be registered with a cellular RAT and may operate in a DRX cycle for the cellular service (e.g., maintain a cellular stack) while registered with the voice Wi-Fi service. For example, UE 115-a may receive one or more paging messages 210 from network node 205-a (e.g., using a voice Wi-Fi service), such as paging messages 210-a, 210-b, and 210-c. UE 115-a may also monitor (e.g., on a DRX cycle periodicity) for paging messages 210 from base station 105-a (e.g., a cellular network node supporting a cellular RAT), such as paging messages 210-d, 210-e, and 210-f UE 115-a may additionally receive voice, message, or video telephony (VT) pages via paging messages 210 from network node 205-a (e.g., using the voice Wi-Fi service).

Monitoring for paging messages 210 from base station 105-a according to the DRX periodicity may, in some cases, reduce available power (e.g., battery power) at UE 115-a. For example, UE 115-a may already receive paging information associated with wireless communications via paging messages 210 from network node 205-a, but may also monitor for paging messages 210 from base station 105-a. In some cases, UE 115-a may follow the DRX processes (e.g., wake-up and page monitoring) configured for UE 115-a without coordination with the Wi-Fi RAT (e.g., and may therefore monitor for paging messages on both RATs).

The present disclosure provides techniques for UE 115-a to monitor for paging messages 210 from base station 105-a with a different periodicity (e.g., increased periodicity) from the DRX periodicity. For example, UE 115-a may identify a first periodicity for monitoring for paging messages 210 from base station 105-a that is greater than the DRX periodicity, which may reduce monitoring occasions associated with base station 105-a and may increase battery life. UE 115-a may, in some cases, receive cellular paging information via paging messages 210 from network node 205-a, and may thus increase available power without loss of information (e.g., may save 90% of power that may otherwise be used to monitor for paging messages 210).

In some examples, monitoring according to the first periodicity may include monitoring for paging messages 210 from base station 105-a one time within each modification boundary. In some examples, monitoring according to the first periodicity may include monitoring for paging messages 210 from base station 105-a more than once per modification boundary, but at a greater periodicity than the DRX cycle. Monitoring techniques are further described herein with reference to FIG. 3. Accordingly, UE 115-a may monitor for some paging messages 210 (e.g., paging message 210-e) and not for other paging messages 210 (e.g., paging messages 210-d and 210-f) from base station 105-a.

UE 115-a may also change the first periodicity for monitoring for paging messages from base station 105-a based on a quality associated with communications with network node 205-a (e.g., over the Wi-Fi RAT). UE 115-a may be signaled or configured with a quality threshold associated with Wi-Fi communications and may determine to change the first periodicity if the quality associated with the Wi-Fi communications falls below the quality threshold. In some cases, the quality of the Wi-Fi communications may fall below the quality threshold based on a movement or a location of UE 115-a with respect to network node 205-a (e.g., quality may decrease as UE 115-a gets farther away from network node 205-a).

UE 115-a may determine that a quality associated with communications with network node 205-a has fallen below the quality threshold (e.g., Wi-Fi RAT communications get weaker or are lost) and may determine to decrease the first periodicity for monitoring for paging messages from base station 105-a (e.g., based on the lower quality of the Wi-Fi communications). For example, UE 115-a may decrease the first periodicity to the DRX periodicity, or may decrease the first periodicity to a periodicity greater than the DRX periodicity but less than the most recent first periodicity. In some cases, based on the quality of the Wi-Fi communications, UE 115-a may additionally or alternatively perform a handover procedure for the first subscription, which may include handing over communications from network node 205-a (e.g., using the Wi-Fi RAT) to base station 105-a (e.g., using the cellular RAT).

In a second example, UE 115-a may additionally have or be configured with a second subscription that may be registered with a cellular RAT (e.g., base station 105-b), where the second subscription may represent a primary or default data subscription (DDS) and the first subscription may represent a non-default data subscription (nDDS). The second subscription may, in some cases, be registered with a voice Wi-Fi service (e.g., a second network node 205 using a Wi-Fi RAT) or may not be registered with a voice Wi-Fi service. UE 115-a may receive one or more data messages 215 from base station 105-b, for example, because the second subscription associated with base station 105-b may represent a DDS. In this example, the first subscription may be registered for an aggregated cellular and Wi-Fi service (e.g., with base station 105-a and network node 205-a, respectively), and UE 115-*a* may operate in a DRX cycle for the cellular service (e.g., maintain a cellular stack with base station 105-*a*) while being registered with the voice Wi-Fi service. The first subscription may be associated with voice messages or communications, such that data may not be communicated using the first subscription (e.g., because the first subscription is nDDS).

While receiving one or more data messages 215 from base station 105-*b*, UE 115-*a* may, in some cases, perform a tuneaway procedure (e.g., open tuning gaps) from base station 105-*b* to base station 105-*a*. The tuneaway procedure may include monitoring for one or more paging messages 210 from base station 105-*a* (e.g., paging messages 210-*d*, 210-*e*, and 210-*f*) according to a DRX cycle periodicity, while temporarily stopping communications with base station 105-*b* (e.g., refraining from monitoring for data messages 215). Performing the tuneaway procedure according to the DRX cycle periodicity may reduce throughput associated with data messages 215, for example, by refraining from monitoring for data messages 215 while performing the tuneaway procedure. Additionally or alternatively, base station 105-*b* may reduce the throughput associated with the data messages 215 based on feedback from UE 115-*a* (e.g., indicating missed data due to the tuneaway procedure).

The present disclosure provides techniques for UE 115-*a* to perform a tuneaway procedure and monitor for paging messages 210 from base station 105-*a* with a different periodicity (e.g., increased periodicity) than the DRX periodicity. For example, UE 115-*a* may identify a first periodicity for monitoring for paging messages 210 from base station 105-*a* that is greater than the DRX periodicity, which may reduce tuneaway procedures to base station 105-*a* and increase data throughput associated with receiving data messages 215 from base station 105-*b* (e.g., may increase throughput by 15%).

In some examples, monitoring according to the first periodicity may include monitoring for paging messages 210 from base station 105-*a* and opening a tuneaway one time within a modification boundary. In some examples, UE 115-*a* may perform the tuneaway procedure more than once per modification boundary, but at a greater periodicity than the DRX cycle (e.g., which may have a periodicity of 320 ms on the nDDS). Monitoring according to the first periodicity may include skipping one or more tuneaway procedures that UE 115-*a* may have otherwise performed (e.g., UE 115-*a* may skip all but one tuneaway procedure per modification boundary). Accordingly, UE 115-*a* may monitor for some paging messages 210 (e.g., paging message 210-*e*) and not for other paging messages 210 (e.g., paging messages 210-*d* and 210-*f*) from base station 105-*a*.

As described herein with respect to the first example, UE 115-*a* may also change the first periodicity for performing tuneaway and monitoring for paging messages 210 from base station 105-*a* based on a quality associated with communications with network node 205-*a* (e.g., over the Wi-Fi RAT). For example, UE 115-*a* may be signaled or configured with a quality threshold associated with Wi-Fi communications and may determine to change the first periodicity or perform a handover to a cellular RAT for the first subscription if the quality associated with the Wi-Fi communications falls below the quality threshold.

Figure 3:
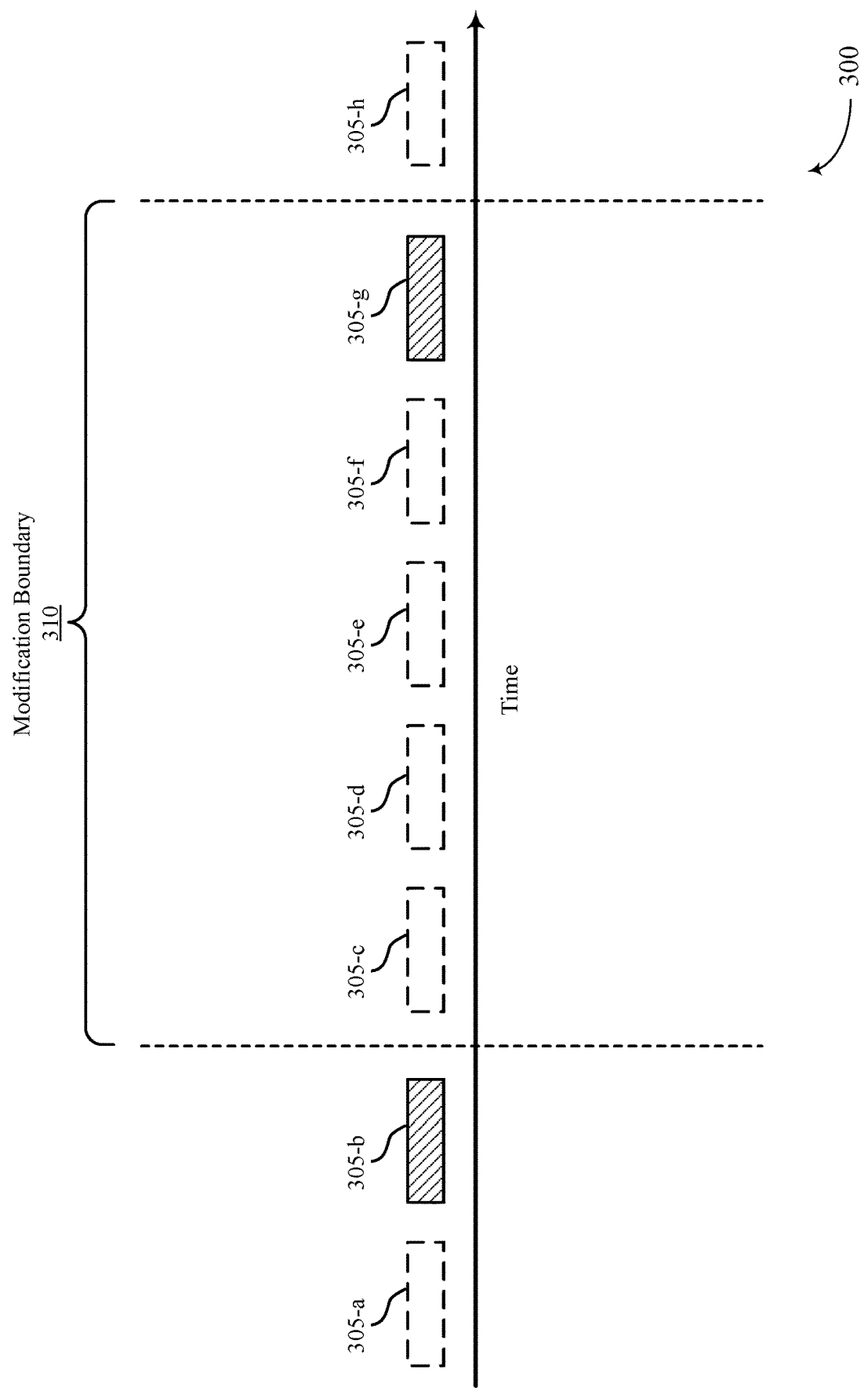
FIG. 3 illustrates an example of a monitoring scheme that supports monitoring periodicity for paging messages in accordance with aspects of the present disclosure.

FIG. 3 illustrates an example of a monitoring scheme 300 that supports adjusting a monitoring periodicity for paging messages in accordance with aspects of the present disclosure. In some examples, monitoring scheme 300 may implement or be implemented by aspects of wireless communications system 100 or 200. For example, a UE 115 may implement monitoring scheme 300 when monitoring for paging messages from a base station 105 using an increased periodicity (e.g., a first periodicity greater than a DRX periodicity). The UE 115 and the base station 105 may represent examples of a UE 115 and a base station 105 as described herein with reference to FIGS. 1 and 2. The paging messages may represent paging information for cellular communications, paging messages monitored for a tuneaway procedure, or any combination thereof, as described with reference to FIG. 2.

As described with reference to FIG. 2, the UE 115 may monitor for paging messages from the base station 105 according to the first periodicity by monitoring one time within a modification boundary 310, or by monitoring more than once per modification boundary 310 but at a greater periodicity than a periodicity for DRX periods 305 (e.g., a DRX cycle periodicity). A DRX period 305 may represent a portion of time of a DRX cycle for which the UE 115 wakes up to monitor for paging messages from the base station 105.

A modification boundary 310 may include a number of DRX periods 305 or cycles (e.g., five or ten DRX cycles, which may represent approximately 5 seconds or 10 seconds, respectively). A modification boundary 310 may represent a duration of time in which system information from the base station 105 stays the same. The UE 115 may be configured with modification boundary information, for example, by the base station 105 (e.g., or another base station 105) upon power up and establishment of a cellular network connection. In some cases, paging messages within a last DRX period 305 of the modification boundary 310 (e.g., DRX period 305-*b* or 305-*g*) may include information indicating whether a change to system information is to take place in a next modification boundary 310.

In a first example, the UE 115 may wake up and monitor for paging messages during the last DRX periods 305 (e.g., DRX periods 305-*b* and 305-*g*) and may determine (e.g., based on information from one or more paging messages) whether a change to system information (e.g., one or more system information blocks (SIBs)) is to take place in the next modification boundary 310. The UE 115 may also determine whether any emergency alerts exist (e.g., based on information from the one or more paging messages) and may perform cellular measurements (e.g., channel estimation) during the last DRX periods 305. If the change in system information is to take place, the UE 115 may determine to monitor for new system information in the next modification boundary. If no change is to take place, the UE 115 may determine to refrain from monitoring for the new system information in the next modification boundary.

In some cases, the UE 115 may monitor for paging messages from the base station 105 with a greater periodicity than the DRX periods 305 (e.g., greater than a configured DRX periodicity) but more than one time per modification boundary 310. For example, the UE 115 may monitor for the paging messages during DRX periods 305-*d* and 305-*g*, or during DRX periods 305-*c* and 305-*e*, or using any combination of DRX periods 305 that does not include each DRX period 305. Additionally or alternatively, the UE 115 may monitor for the paging messages outside of DRX periods 305, but may do so once per modification boundary 310, or more than once per modification boundary 310 but less than a number of DRX periods 305 of the modification boundary 310.

Figure 4:
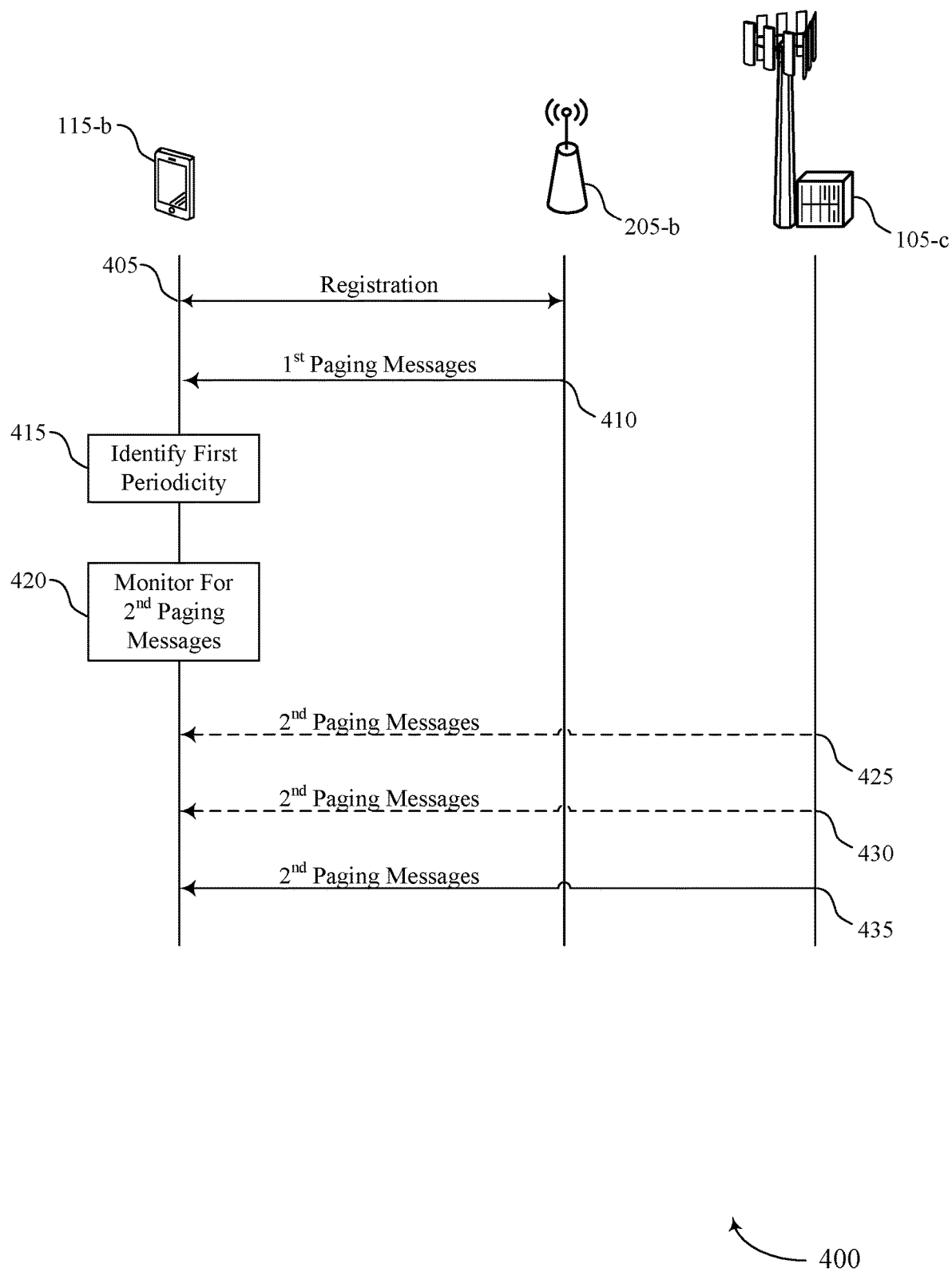
FIG. 4 illustrates an example of a process flow that supports monitoring periodicity for paging messages in accordance with aspects of the present disclosure.

FIG. 4 illustrates an example of a process flow 400 that supports adjusting a monitoring periodicity for paging messages in accordance with aspects of the present disclosure. In some examples, process flow 400 may implement or be implemented by aspects of wireless communications system 100 or 200. For example, process flow 400 may be implemented by a UE 115-*b*, a network node 205-*b*, and a base station 105-*c*. UE 115-*b* and base station 105-*c* may represent examples of a UE 115 and a base station 105 described with reference to FIGS. 1-3, and network node 205-*b* may represent an example of a network node 205 described with reference to FIG. 2.

In the following description of process flow 400, the operations between UE 115-*b*, network node 205-*b*, and base station 105-*c* may be transmitted in a different order than the order shown, or the operations performed by UE 115-*b*, network node 205-*b*, and base station 105-*c* may be performed in different orders or at different times. For example, specific operations may also be left out of process flow 400, or other operations may be added to process flow 400. Although UE 115-*b*, network node 205-*b*, and base station 105-*c* are shown performing the operations of process flow 400, some aspects of some operations may also be performed by one or more other wireless devices.

At 405, UE 115-*b* may establish a voice communication registration for communicating voice services (e.g., VoWifi or VT-Wifi) over unlicensed radio spectrum using a first RAT (e.g., a Wi-Fi RAT). The voice communication registration may be established by a first subscription of UE 115-*b* and may be established with network node 205-*b*. The communications with network node 205-*b* may be examples of a voice Wi-Fi service over a Wi-Fi RAT as described herein. UE 115-*b* may also establish a cellular registration by the first subscription and with base station 105-*c* (e.g., a cellular network node).

At 410, network node 205-*b* may transmit first paging messages to UE 115-*b* over the unlicensed radio spectrum using the first RAT (e.g., the Wi-Fi RAT). The first paging messages may, in some cases, include information associated with or similar to second paging messages transmitted by base station 105-*c* to UE 115-*b* using a second RAT (e.g., a cellular RAT).

At 415, UE 115-*b* may identify a first monitoring periodicity for monitoring for the second paging messages from base station 105-*c* based on receiving the first paging messages from network node 205-*b*. As described herein, the first monitoring periodicity may be greater than a DRX cycle periodicity associated with base station 105-*c*. For example, UE 115-*b* may identify that the first monitoring periodicity is once per modification boundary (e.g., a monitoring duration), or more than once per modification boundary but greater than the DRX cycle periodicity. In some cases, UE 115-*b* may monitor for the second paging messages within a last monitoring occasion (e.g., last DRX cycle) of the modification boundary.

In some cases, UE 115-*b* may monitor for the second paging messages in order to identify changes to system information or emergency alerts, or to perform cellular measurements. In some cases, UE 115-*b* may monitor for the second paging messages as part of performing a tuneaway procedure from another base station 105 to base station 105-*c*. When performing the tuneaway procedure according to the first periodicity, UE 115-*b* may skip one or more other tuneaway procedures.

At 420, UE 115-*b* may monitor, by the first subscription, for the second paging messages from base station 105-*c* during one or more monitoring occasions, and according to the first monitoring periodicity. For example, UE 115-*b* may monitor for the second paging messages once per modification boundary or multiple times per modification boundary (e.g., but greater than a DRX cycle periodicity) UE 115-*b* may receive one or more of the second paging messages from base station 105-*c* based on the monitoring.

For example, at 435, UE 115-*b* may receive the one or more second paging messages from base station 105-*c* based on monitoring during monitoring occasions associated with the first periodicity. In some cases, base station 105-*b* may transmit the second paging messages at 425, at 430, and at 435, and UE 115-*b* may monitor for and receive the second paging messages at 435. UE 115-*b* may refrain from monitoring for the second paging messages at 425 and 430 (e.g., based on monitoring according to the first periodicity) and may accordingly fail to receive the second paging messages at 425 and 430. In some cases, UE 115-*b* may refrain from monitoring during more monitoring occasions, or in some cases, may refrain from monitoring during less monitoring occasions.

Figure 5:
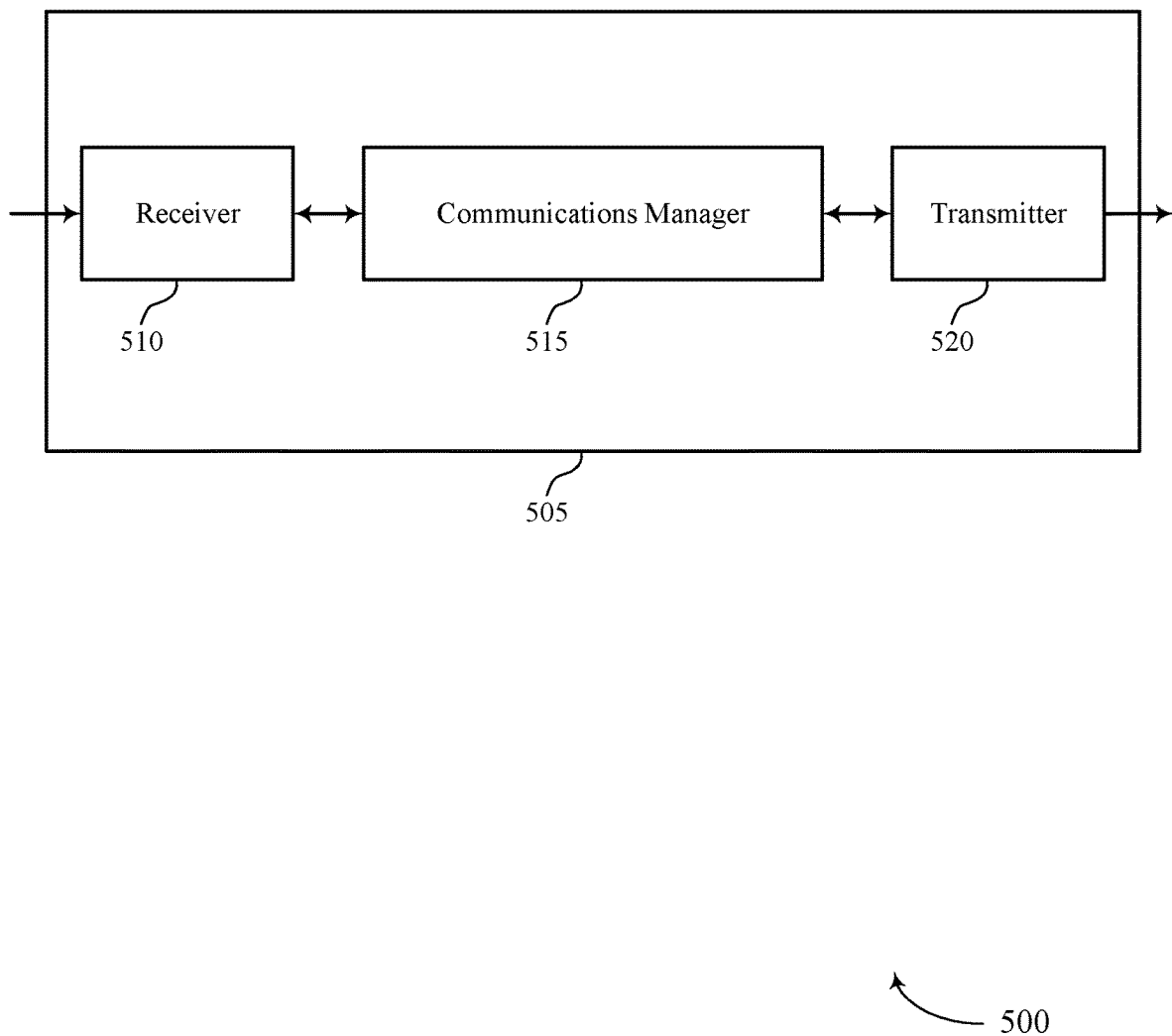
FIGS. 5 and 6 show block diagrams of devices that support monitoring periodicity for paging messages in accordance with aspects of the present disclosure.

FIG. 5 shows a block diagram 500 of a device 505 that supports adjusting a monitoring periodicity for paging messages in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to monitoring periodicity for paging messages, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish, by a first subscription of the UE and with a network node, a voice communication registration for communicating voice services over unlicensed radio spectrum using a first RAT, receive first paging messages from the network node over the unlicensed radio spectrum using the first RAT, identify, based on receiving the first paging messages from the network node, a first monitoring periodicity for monitoring for second paging messages from a cellular network node that uses a second RAT, where the first monitoring periodicity is greater than a DRX periodicity associated with the cellular network node, and monitor, by the first subscription, for the second paging messages from the cellular network node during one or more monitoring occasions according to the first monitoring periodicity. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515, among other examples herein, may be implemented to realize one or more potential advantages. For example, communications manager 515 may increase available battery power, communication quality, and data throughput at a wireless device (e.g., a UE 115) by supporting an increased periodicity for monitoring for paging messages from a cellular RAT. The increase in communication quality and data throughput may result in increased link performance and decreased overhead based on the increased periodicity for monitoring for paging messages. Accordingly, communications manager 515 may save power and increase battery life at a wireless device (e.g., a UE 115) by strategically increasing a quality of communications at a wireless device (e.g., a UE 115).

Figure 6:
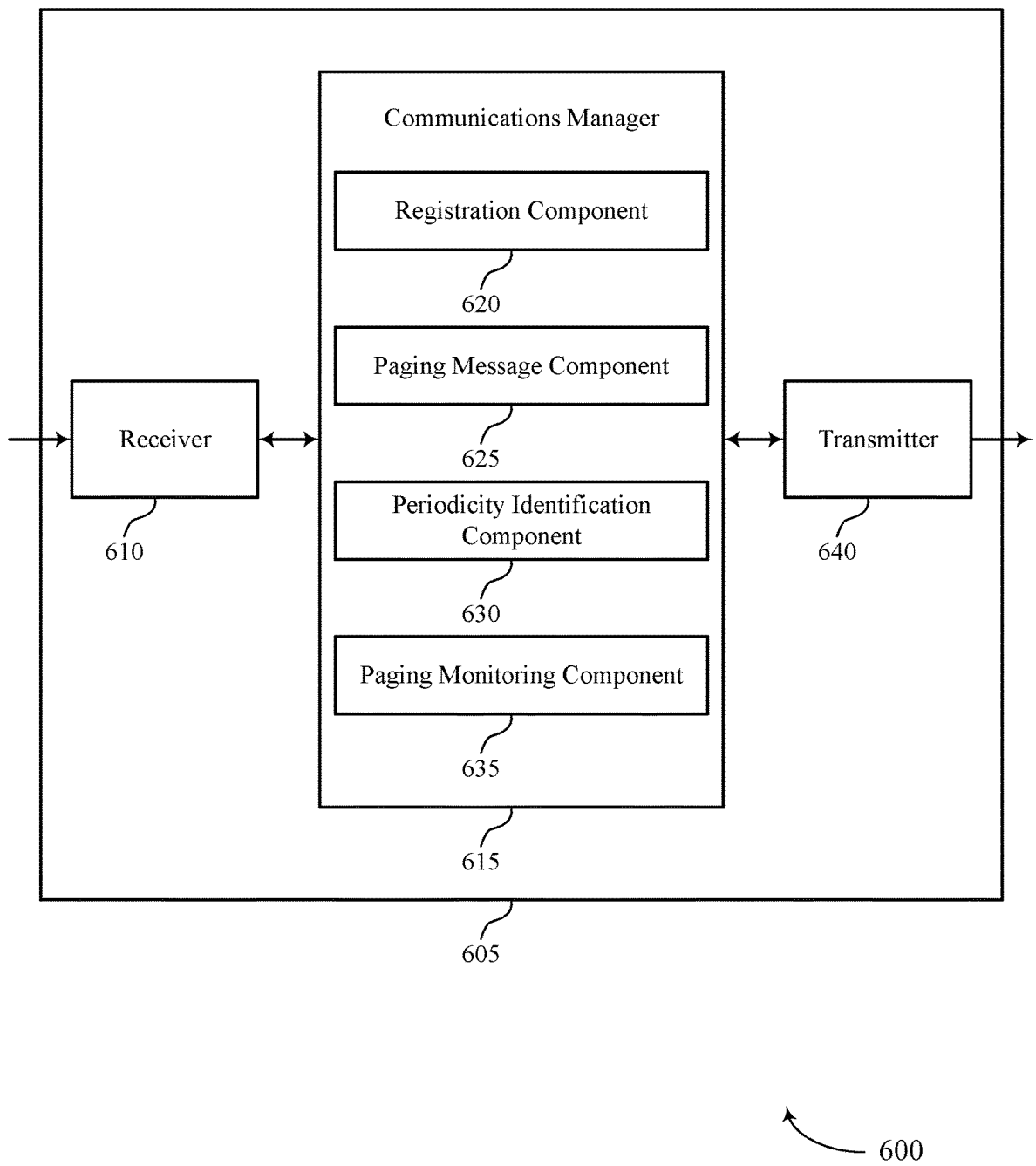

FIG. 6 shows a block diagram 600 of a device 605 that supports adjusting a monitoring periodicity for paging messages in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to monitoring periodicity for paging messages, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a registration component 620, a paging message component 625, a periodicity identification component 630, and a paging monitoring component 635. The communications manager 615 may be an example of aspects of the communications manager 810 described herein.

The registration component 620 may establish, by a first subscription of the UE and with a network node, a voice communication registration for communicating voice services over unlicensed radio spectrum using a first RAT.

The paging message component 625 may receive first paging messages from the network node over the unlicensed radio spectrum using the first RAT.

The periodicity identification component 630 may identify, based on receiving the first paging messages from the network node, a first monitoring periodicity for monitoring for second paging messages from a cellular network node that uses a second RAT, where the first monitoring periodicity is greater than a DRX periodicity associated with the cellular network node.

The paging monitoring component 635 may monitor, by the first subscription, for the second paging messages from the cellular network node during one or more monitoring occasions according to the first monitoring periodicity.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

A processor of a wireless device (e.g., controlling the receiver 610, the transmitter 640, or the transceiver 820 as described with reference to FIG. 8) may increase available battery power, communication quality, and data throughput. The increased communication quality may increase available battery power, communication quality, and data throughput (e.g., via implementation of system components described with reference to FIG. 7) compared to other systems and techniques, for example, that do not support an increased periodicity for monitoring for paging messages from a cellular RAT, which may decrease communication quality and increase power consumption. Further, the processor of the UE 115 may identify one or more aspects of the increased periodicity for monitoring for paging messages. The processor of the wireless device may use the increased periodicity for monitoring for paging messages to perform one or more actions that may result in increased communication quality, as well as save power and increase battery life at the wireless device (e.g., by strategically supporting increasing communication quality by using the increased periodicity), among other benefits.

Figure 7:
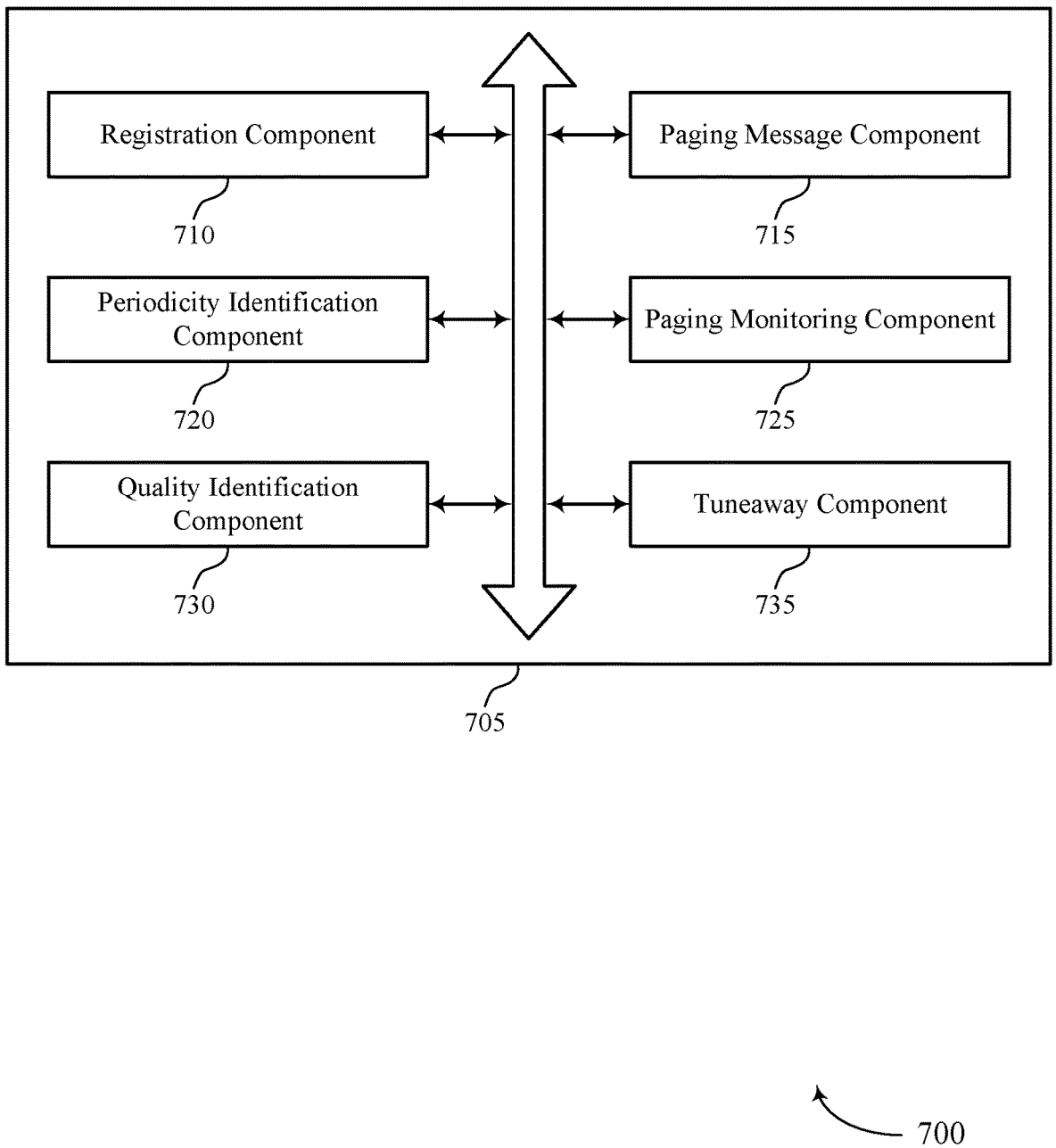
FIG. 7 shows a block diagram of a communications manager that supports monitoring periodicity for paging messages in accordance with aspects of the present disclosure.

FIG. 7 shows a block diagram 700 of a communications manager 705 that supports adjusting a monitoring periodicity for paging messages in accordance with aspects of the present disclosure. The communications manager 705 may be an example of aspects of a communications manager 515, a communications manager 615, or a communications manager 810 described herein. The communications manager 705 may include a registration component 710, a paging message component 715, a periodicity identification component 720, a paging monitoring component 725, a quality identification component 730, and a tuneaway component 735. Each of these modules may communicate, directly or indirectly, with one another (e.g., via one or more buses).

The registration component 710 may establish, by a first subscription of the UE and with a network node, a voice communication registration for communicating voice services over unlicensed radio spectrum using a first RAT. The paging message component 715 may receive first paging messages from the network node over the unlicensed radio spectrum using the first RAT.

The periodicity identification component 720 may identify, based on receiving the first paging messages from the network node, a first monitoring periodicity for monitoring for second paging messages from a cellular network node that uses a second RAT, where the first monitoring periodicity is greater than a DRX periodicity associated with the cellular network node. In some examples, the periodicity identification component 720 may identify a set of configured monitoring durations, each configured monitoring duration including a set of monitoring occasions. In some cases, each configured monitoring duration of the set includes a modification boundary including five or more monitoring occasions.

The paging monitoring component 725 may monitor, by the first subscription, for the second paging messages from the cellular network node during one or more monitoring occasions according to the first monitoring periodicity. In some examples, the paging monitoring component 725 may monitor within a last monitoring occasion of each of the set of configured monitoring durations. In some examples, the paging monitoring component 725 may refrain from monitoring a remainder of the set of monitoring occasions of each of the set of configured monitoring durations other than the last monitoring occasion of each of the set of configured monitoring durations.

In some examples, the paging monitoring component 725 may monitor, within the last monitoring occasion of each of the set of configured monitoring durations, for an indication of a change in system information from the cellular network node to take place in a next monitoring duration. In some examples, the paging monitoring component 725 may perform, within the last monitoring occasion of each of the set of configured monitoring durations, measurements associated with signals from the cellular network node.

The quality identification component 730 may identify a quality threshold associated with communications with the network node using the first RAT. In some examples, the quality identification component 730 may determine a quality associated with the communications with the network node using the first RAT. In some examples, the quality identification component 730 may decrease the first monitoring periodicity based on the quality falling below the quality threshold. In some examples, the quality identification component 730 may set the first monitoring periodicity to the DRX periodicity.

The tuneaway component 735 may perform a tuneaway procedure from a second cellular network node to the cellular network node according to the first monitoring periodicity. In some examples, the tuneaway component 735 may identify a set of configured monitoring durations, each configured monitoring duration including a set of monitoring occasions. In some examples, the tuneaway component 735 may perform the tuneaway procedure within a last monitoring occasion of each of the set of configured monitoring durations. In some examples, the tuneaway component 735 may establish, by the second subscription and with a second network node, a second voice communication registration for communicating voice services over unlicensed radio spectrum using the first RAT. In some cases, a second subscription of the UE is configured as a DDS, the second subscription registered with the second cellular network node that uses the second RAT. In some cases, the first subscription is configured as an nDDS.

Figure 8:
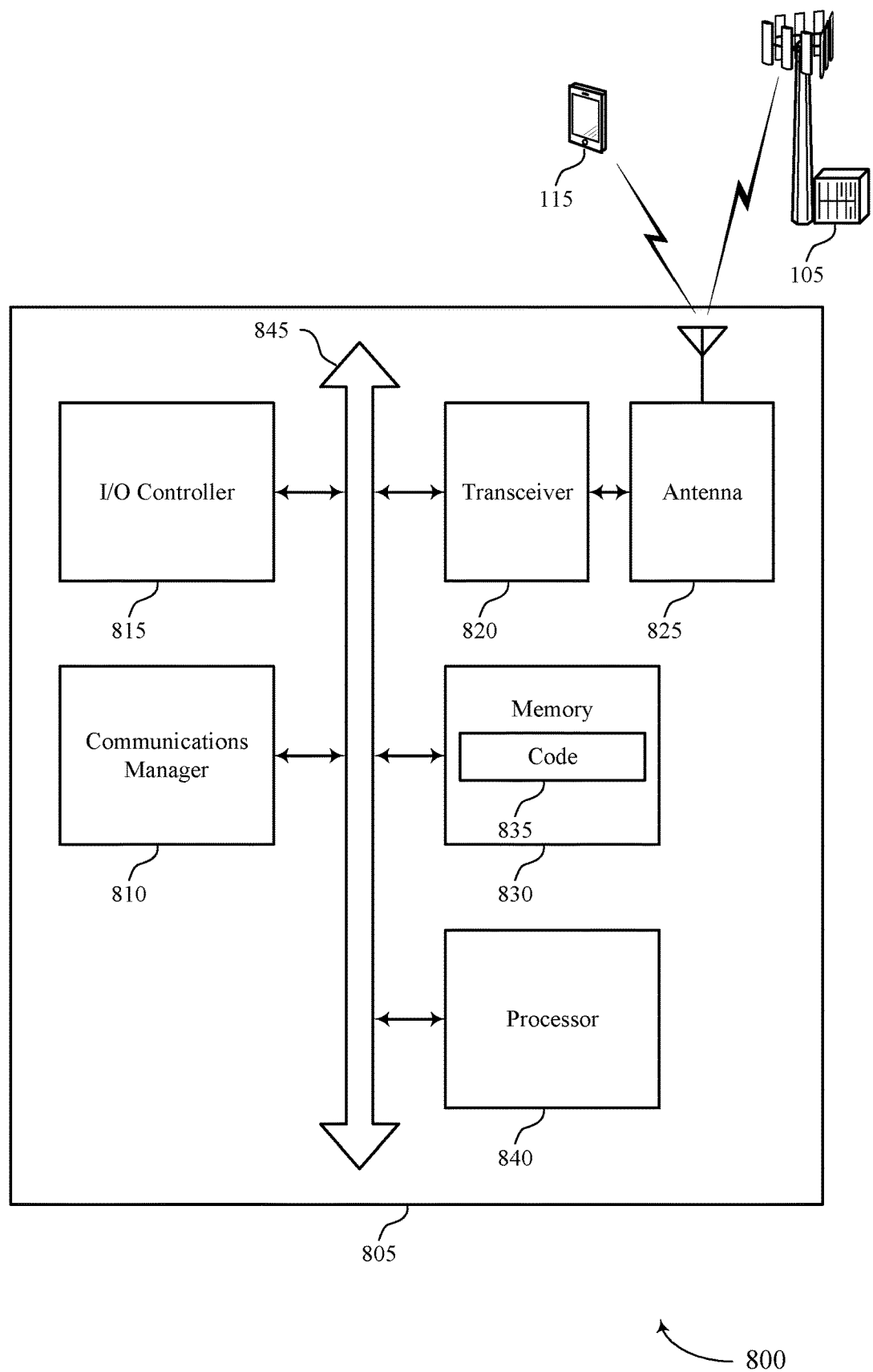
FIG. 8 shows a diagram of a system including a device that supports monitoring periodicity for paging messages in accordance with aspects of the present disclosure.

FIG. 8 shows a diagram of a system 800 including a device 805 that supports adjusting a monitoring periodicity for paging messages in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish, by a first subscription of the UE and with a network node, a voice communication registration for communicating voice services over unlicensed radio spectrum using a first RAT, receive first paging messages from the network node over the unlicensed radio spectrum using the first RAT, identify, based on receiving the first paging messages from the network node, a first monitoring periodicity for monitoring for second paging messages from a cellular network node that uses a second RAT, where the first monitoring periodicity is greater than a DRX periodicity associated with the cellular network node, and monitor, by the first subscription, for the second paging messages from the cellular network node during one or more monitoring occasions according to the first monitoring periodicity.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting monitoring periodicity for paging messages).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
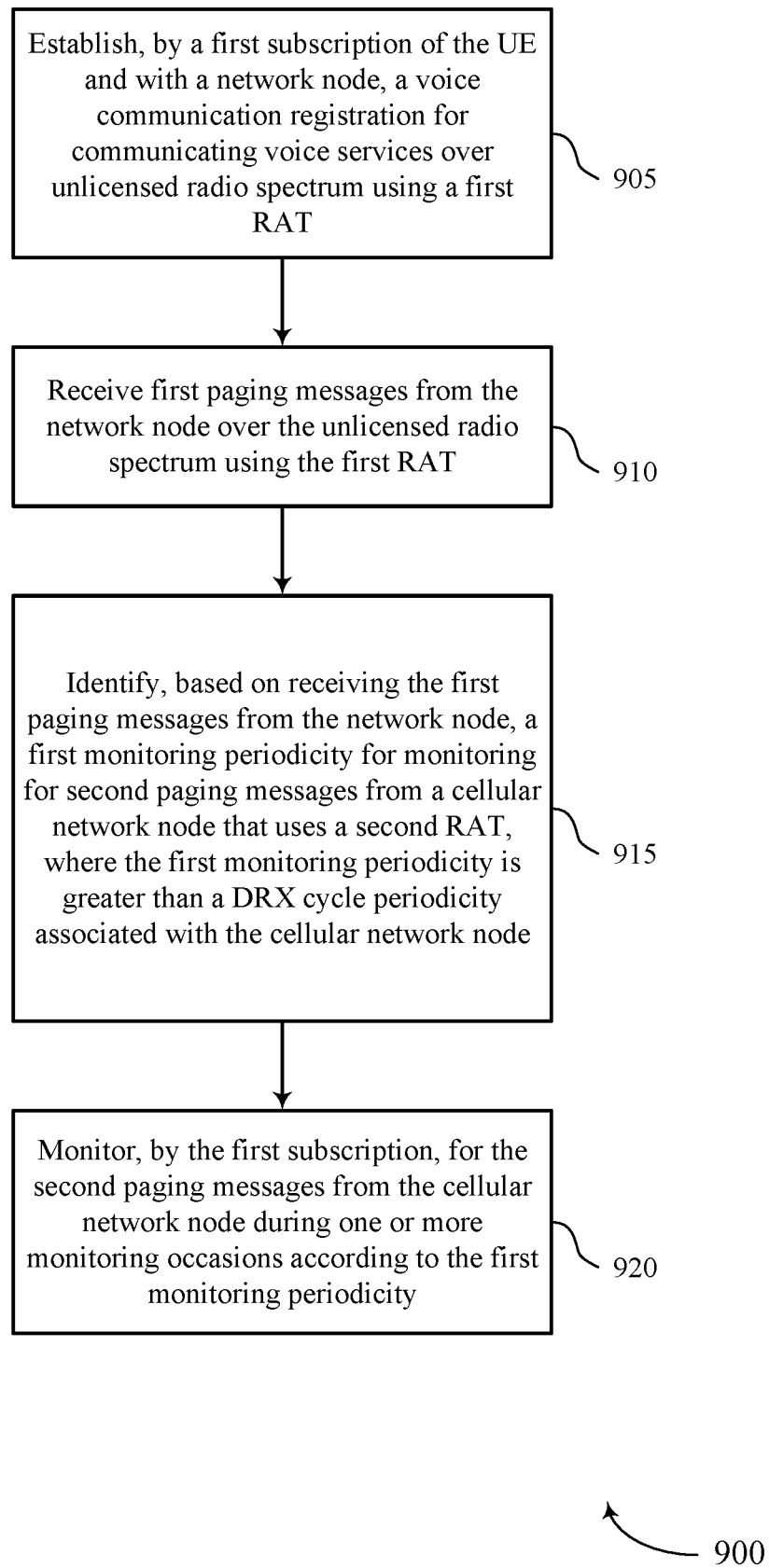
FIGS. 9 and 10 show flowcharts illustrating methods that support monitoring periodicity for paging messages in accordance with aspects of the present disclosure.

FIG. 9 shows a flowchart illustrating a method 900 that supports adjusting a monitoring periodicity for paging messages in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may establish, by a first subscription of the UE and with a network node, a voice communication registration for communicating voice services over unlicensed radio spectrum using a first RAT. The operations of 905 may be performed according to the methods described herein. In some examples, aspects of the operations of 905 may be performed by a registration component as described with reference to FIGS. 5 through 8.

At 910, the UE may receive first paging messages from the network node over the unlicensed radio spectrum using the first RAT. The operations of 910 may be performed according to the methods described herein. In some examples, aspects of the operations of 910 may be performed by a paging message component as described with reference to FIGS. 5 through 8.

At 915, the UE may identify, based on receiving the first paging messages from the network node, a first monitoring periodicity for monitoring for second paging messages from a cellular network node that uses a second RAT, where the first monitoring periodicity is greater than a DRX periodicity associated with the cellular network node. The operations of 915 may be performed according to the methods described herein. In some examples, aspects of the operations of 915 may be performed by a periodicity identification component as described with reference to FIGS. 5 through 8.

At 920, the UE may monitor, by the first subscription, for the second paging messages from the cellular network node during one or more monitoring occasions according to the first monitoring periodicity. The operations of 920 may be performed according to the methods described herein. In some examples, aspects of the operations of 920 may be performed by a paging monitoring component as described with reference to FIGS. 5 through 8.

Figure 10:
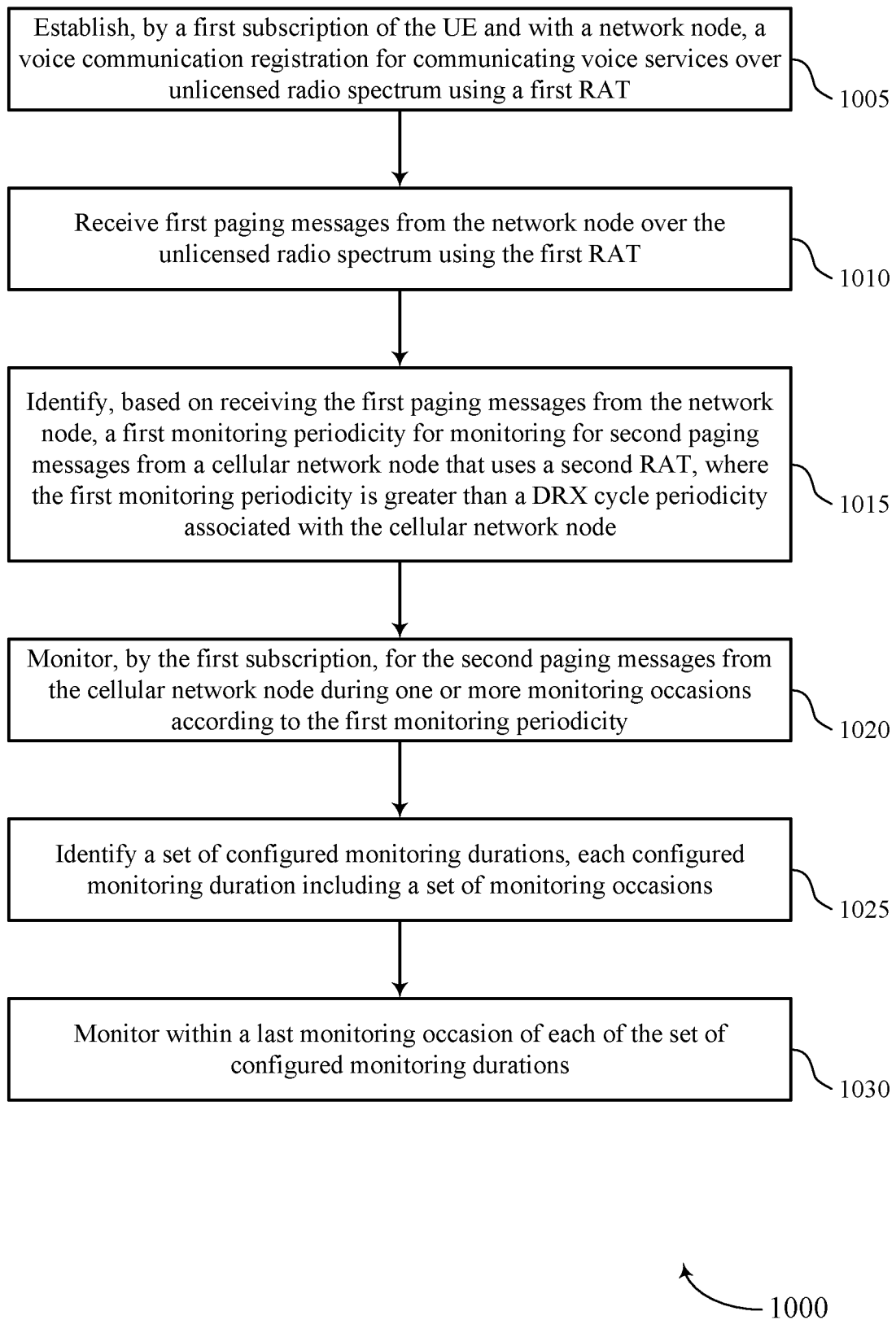

FIG. 10 shows a flowchart illustrating a method 1000 that supports adjusting a monitoring periodicity for paging messages in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may establish, by a first subscription of the UE and with a network node, a voice communication registration for communicating voice services over unlicensed radio spectrum using a first RAT. The operations of 1005 may be performed according to the methods described herein. In some examples, aspects of the operations of 1005 may be performed by a registration component as described with reference to FIGS. 5 through 8.

At 1010, the UE may receive first paging messages from the network node over the unlicensed radio spectrum using the first RAT. The operations of 1010 may be performed according to the methods described herein. In some examples, aspects of the operations of 1010 may be performed by a paging message component as described with reference to FIGS. 5 through 8.

At 1015, the UE may identify, based on receiving the first paging messages from the network node, a first monitoring periodicity for monitoring for second paging messages from a cellular network node that uses a second RAT, where the first monitoring periodicity is greater than a DRX periodicity associated with the cellular network node. The operations of 1015 may be performed according to the methods described herein. In some examples, aspects of the operations of 1015 may be performed by a periodicity identification component as described with reference to FIGS. 5 through 8.

At 1020, the UE may monitor, by the first subscription, for the second paging messages from the cellular network node during one or more monitoring occasions according to the first monitoring periodicity. The operations of 1020 may be performed according to the methods described herein. In some examples, aspects of the operations of 1020 may be performed by a paging monitoring component as described with reference to FIGS. 5 through 8.

At 1025, the UE may identify a set of configured monitoring durations, each configured monitoring duration including a set of monitoring occasions. The operations of 1025 may be performed according to the methods described herein. In some examples, aspects of the operations of 1025 may be performed by a periodicity identification component as described with reference to FIGS. 5 through 8.

At 1030, the UE may monitor within a last monitoring occasion of each of the set of configured monitoring durations. The operations of 1030 may be performed according to the methods described herein. In some examples, aspects of the operations of 1030 may be performed by a paging monitoring component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

identifying, based at least in part on a configuration from a network node, a discontinuous reception cycle periodicity;

establishing, by the UE and via a first subscription of the UE, a voice communication registration with the network node for communicating voice services over unlicensed radio spectrum using a first radio access technology;

establishing, by the UE and via a second subscription of the UE, a default data registration with a cellular network node that uses a second radio access technology;

receiving, during a first monitoring duration, first paging messages from the network node over the unlicensed radio spectrum using the first radio access technology, the first paging messages indicating that a change in one or more system information blocks (SIBs) is to occur in a subsequent monitoring duration;

identifying, based at least in part on receiving the first paging messages from the network node, a first monitoring periodicity for monitoring for second paging messages from the cellular network node, wherein the first monitoring periodicity is greater than the discontinuous reception cycle periodicity associated with the network node;
performing a tuneaway procedure from the network node to the cellular network node during a monitoring occasion of the subsequent monitoring duration;
monitoring, by the UE and via the second subscription, for the second paging messages from the cellular network node during the monitoring occasion of the subsequent monitoring duration according to the first monitoring periodicity;
receiving, at the UE and via the second subscription, at least one second paging message from the cellular network node during the monitoring occasion of the subsequent monitoring duration based at least in part on the monitoring, the at least one second paging message indicating the change in the one or more SIBs; and
skipping one or more tuneaway procedures from the network node to the cellular network node during remaining monitoring occasions of the subsequent monitoring duration according to the first monitoring periodicity.

2. The method of claim 1, wherein identifying the first monitoring periodicity comprises:
identifying a plurality of configured monitoring durations, each configured monitoring duration in the plurality of configured monitoring durations comprising a plurality of monitoring occasions; and
monitoring a last monitoring occasion of each of the plurality of configured monitoring durations.

3. The method of claim 2, further comprising:
refraining from monitoring a remainder of the plurality of monitoring occasions of each of the plurality of configured monitoring durations other than the last monitoring occasion of each of the plurality of configured monitoring durations.

4. The method of claim 2, wherein each configured monitoring duration of the plurality of configured monitoring durations comprises a modification boundary comprising five or more monitoring occasions.

5. The method of claim 2, further comprising:
monitoring, within the last monitoring occasion of each of the plurality of configured monitoring durations, for an indication of the change in the one or more SIBs.

6. The method of claim 2, further comprising:
performing, within the last monitoring occasion of each of the plurality of configured monitoring durations, measurements associated with signals from the cellular network node.

7. The method of claim 1, further comprising:
identifying a quality threshold associated with communications with the network node using the first radio access technology;
determining a quality associated with the communications with the network node using the first radio access technology; and
decreasing the first monitoring periodicity based at least in part on the quality falling below the quality threshold.

8. The method of claim 7, wherein decreasing the first monitoring periodicity comprises:
setting the first monitoring periodicity to the discontinuous reception cycle periodicity.

9. The method of claim 1, wherein the first subscription is configured as a non-default data subscription.

10. The method of claim 1, wherein performing the tuneaway procedure comprises:
identifying a plurality of configured monitoring durations, each configured monitoring duration in the plurality of configured monitoring durations comprising a plurality of monitoring occasions; and
performing the tuneaway procedure within a last monitoring occasion of each of the plurality of configured monitoring durations.

11. The method of claim 1, further comprising:
establishing, by the UE and via the second subscription, a second voice communication registration with a second network node for communicating voice services over unlicensed radio spectrum using the first radio access technology.

12. An apparatus for wireless communications at a user equipment (UE), comprising:
a processor;
memory coupled with the processor; and
instructions stored in the memory and executable by the processor to cause the apparatus to:
identify, based at least in part on a configuration from a network node, a discontinuous reception cycle periodicity;
establish, by the UE and via a first subscription of the UE, a voice communication registration with the network node for communicating voice services over unlicensed radio spectrum using a first radio access technology;
establish, by the UE and via a second subscription of the UE, a default data registration with a cellular network node that uses a second radio access technology;
receive, during a first monitoring duration, first paging messages from the network node over the unlicensed radio spectrum using the first radio access technology, the first paging messages indicating that a change in one or more system information blocks (SIBS) is to occur in a subsequent monitoring duration;
identify, based at least in part on receiving the first paging messages from the network node, a first monitoring periodicity for monitoring for second paging messages from the cellular network node, wherein the first monitoring periodicity is greater than the discontinuous reception cycle periodicity associated with the network node;
perform a tuneaway procedure from the network node to the cellular network node during a monitoring occasion of the subsequent monitoring duration;
monitor, by the UE and via the second subscription, for the second paging messages from the cellular network node during the monitoring occasion of the subsequent monitoring duration according to the first monitoring periodicity;
receive, at the UE and via the second subscription, at least one second paging message from the cellular network node during the monitoring occasion of the subsequent monitoring duration based at least in part on the monitoring, the at least one second paging message indicating the change in the one or more SIBs; and
skip one or more tuneaway procedures from the network node to the cellular network node during remaining monitoring occasions of the subsequent monitoring duration according to the first monitoring periodicity.

13. The apparatus of claim 12, wherein the instructions to identify the first monitoring periodicity are executable by the processor to cause the apparatus to:
  identify a plurality of configured monitoring durations, each configured monitoring duration in the plurality of configured monitoring durations comprising a plurality of monitoring occasions; and
  monitor a last monitoring duration of each of the plurality of configured monitoring durations.

14. The apparatus of claim 13, wherein the instructions are further executable by the processor to cause the apparatus to:
  refrain from monitoring a remainder of the plurality of monitoring occasions of each of the plurality of configured monitoring durations other than the last monitoring occasion of each of the plurality of configured monitoring durations.

15. The apparatus of claim 13, wherein each configured monitoring duration of the plurality of configured monitoring durations comprises a modification boundary comprising five or more monitoring occasions.

16. The apparatus of claim 13, wherein the instructions are further executable by the processor to cause the apparatus to:
  monitor, within the last monitoring occasion of each of the plurality of configured monitoring durations, for an indication of the change in the one or more SIBs.

17. The apparatus of claim 13, wherein the instructions are further executable by the processor to cause the apparatus to:
  perform, within the last monitoring occasion of each of the plurality of configured monitoring durations, measurements associated with signals from the cellular network node.

18. The apparatus of claim 12, wherein the instructions are further executable by the processor to cause the apparatus to:
  identify a quality threshold associated with communications with the network node using the first radio access technology;
  determine a quality associated with the communications with the network node using the first radio access technology; and
  decrease the first monitoring periodicity based at least in part on the quality falling below the quality threshold.

19. The apparatus of claim 18, wherein the instructions to decrease the first monitoring periodicity are executable by the processor to cause the apparatus to:
  set the first monitoring periodicity to the discontinuous reception cycle periodicity.

20. The apparatus of claim 12, wherein the first subscription is configured as a non-default data subscription.

21. The apparatus of claim 12, wherein the instructions to perform the tuneaway procedure are executable by the processor to cause the apparatus to:
  identify a plurality of configured monitoring durations, each configured monitoring duration in the plurality of configured monitoring durations comprising a plurality of monitoring occasions; and
  perform the tuneaway procedure within a last monitoring occasion of each of the plurality of configured monitoring durations.

22. The apparatus of claim 12, wherein the instructions are further executable by the processor to cause the apparatus to:
  establish, by the UE and via the second subscription, a second voice communication registration with a second network node for communicating voice services over unlicensed radio spectrum using the first radio access technology.

23. An apparatus for wireless communications at a user equipment (UE), comprising:
  means for identifying, based at least in part on a configuration from a network node, a discontinuous reception cycle periodicity;
  means for establishing, by the UE and via a first subscription of the UE, a voice communication registration with the network node for communicating voice services over unlicensed radio spectrum using a first radio access technology;
  means for establishing, by the UE and via a second subscription of the UE, a default data registration with a cellular network node that uses a second radio access technology;
  means for receiving, during a first monitoring duration, first paging messages from the network node over the unlicensed radio spectrum using the first radio access technology, the first paging messages indicating that a change in one or more system information blocks (SIBS) is to occur in a subsequent monitoring duration;
  means for identifying, based at least in part on receiving the first paging messages from the network node, a first monitoring periodicity for monitoring for second paging messages from the cellular network node, wherein the first monitoring periodicity is greater than the discontinuous reception cycle periodicity associated with the network node;
  means for performing a tuneaway procedure from the network node to the cellular network node during a monitoring occasion of the subsequent monitoring duration:
  means for monitoring, by the UE and via the second subscription, for the second paging messages from the cellular network node during the monitoring occasion of the subsequent monitoring duration according to the first monitoring periodicity;
  means for receiving, at the UE and via the second subscription, at least one second paging message from the cellular network node during the monitoring occasion of the subsequent monitoring duration based at least in part on the monitoring, the at least one second paging message indicating the change in the one or more SIBs; and
  means for skipping one or more tuneaway procedures from the network node to the cellular network node during remaining monitoring occasions of the subsequent monitoring duration according to the first monitoring periodicity.

24. A non-transitory computer-readable medium storing code for wireless communications at a user equipment (UE), the code comprising instructions executable by a processor to:
  identify, based at least in part on a configuration from a network node, a discontinuous reception cycle periodicity;
  establish, by the UE and via a first subscription of the UE, a voice communication registration with the network node for communicating voice services over unlicensed radio spectrum using a first radio access technology;
  establish, by the UE and via a second subscription of the UE, a default data registration with a cellular network node that uses a second radio access technology;
  receive, during a first monitoring duration, first paging messages from the network node over the unlicensed radio spectrum using the first radio access technology, the first paging messages indicating that a change in one or more system information blocks (SIBs) is to occur in a subsequent monitoring duration;

identify, based at least in part on receiving the first paging messages from the network node, a first monitoring periodicity for monitoring for second paging messages from the cellular network node, wherein the first monitoring periodicity is greater than the discontinuous reception cycle periodicity associated with the network node;

perform a tuneaway procedure from the network node to the cellular network node during a monitoring occasion of the subsequent monitoring duration;

monitor, by the UE and via the second subscription, for the second paging messages from the cellular network node during the monitoring occasion of the subsequent monitoring duration according to the first monitoring periodicity;

receive, at the UE and via the second subscription, at least one second paging message from the cellular network node during the monitoring occasion of the subsequent monitoring duration based at least in part on the monitoring, the at least one second paging message indicating the change in the one or more SIBs; and skip one or more tuneaway procedures from the network node to the cellular network node during remaining monitoring occasions of the subsequent monitoring duration according to the first monitoring periodicity.

25. The non-transitory computer-readable medium of claim 24, wherein the instructions to identify the first monitoring periodicity are executable by the processor to:

identify a plurality of configured monitoring durations, each configured monitoring duration in the plurality of configured monitoring durations comprising a plurality of monitoring occasions; and monitor a last monitoring occasion of each of the plurality of configured monitoring durations.

26. The non-transitory computer-readable medium of claim 25, wherein the instructions are further executable by the processor to:

refrain from monitoring a remainder of the plurality of monitoring occasions of each of the plurality of configured monitoring durations other than the last monitoring occasion of each of the plurality of configured monitoring durations.

\* \* \* \* \*